March 13, 1956  R. W. REGENSBURGER  2,737,683
ANIMAL IMMOBILIZING APPARATUS
Filed May 20, 1954  2 Sheets-Sheet 1

INVENTOR.
Richard W. Regensburger
BY
ATTORNEY

March 13, 1956 R. W. REGENSBURGER 2,737,683
ANIMAL IMMOBILIZING APPARATUS
Filed May 20, 1954 2 Sheets-Sheet 2
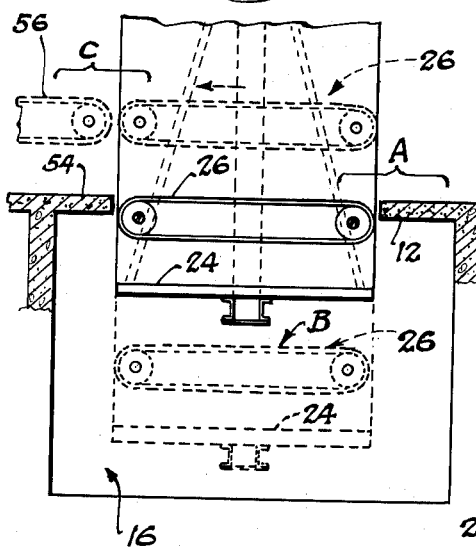
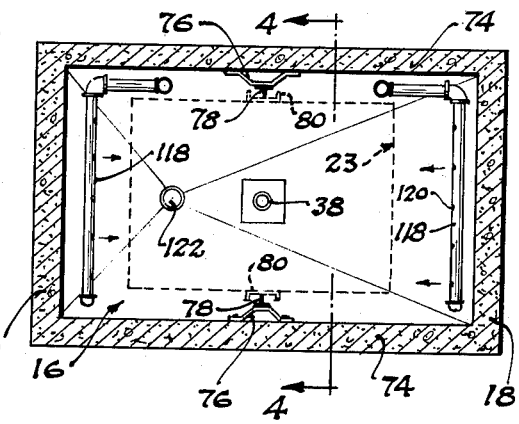
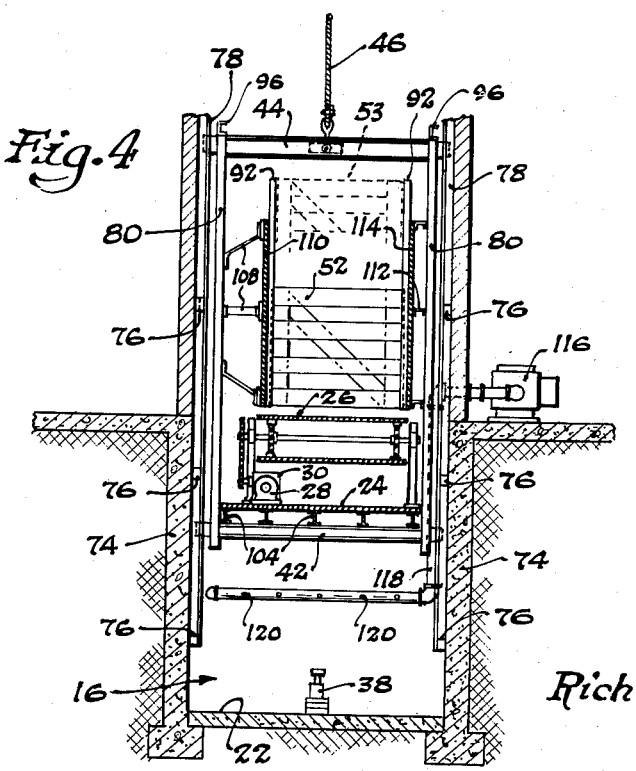
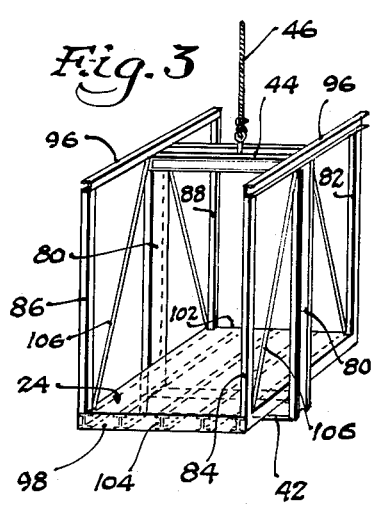
INVENTOR.
Richard W. Regensburger
BY
ATTORNEY

United States Patent Office 2,737,683
Patented Mar. 13, 1956

2,737,683

ANIMAL IMMOBILIZING APPARATUS

Richard W. Regensburger, Flossmoor, Ill., assignor to Swift & Company, Chicago, Ill., a corporation of Illinois Application May 20, 1954, Serial No. 431,053

10 Claims. (Cl. 17—1)

The present invention relates to apparatus utilized in the immobilizing of animals just immediately prior to the slaughtering thereof. More particularly, the present invention is directed to apparatus suitable for automatically handling animals during and subsequent to the immobilization of the animals.

Efforts have been made in the past to improve slaughtering practices not only to meet the views of those interested in the humane aspects but also to improve operating conditions. In the slaughtering of animals, the animals must be handled while excited and active, thereby imposing some unpleasant working conditions upon the operators. Such is particularly true when hogs are slaughtered. The apparatus of the present invention will, therefore, be described in conjunction with hogs, but it should be understood that most any type of animal may be handled by the apparatus of the present invention.

In conventional practice the hogs are collected in a shackling pen while they are shackled by an attendant who manually applies a shackle to one of the hind legs of each hog. From the shackling pen the hogs are then elevated by means of their shackles to an overhead conveyor from which they hang in an inverted position. The conveyor then moves the hogs to the dispatching station where an attendant exsanguinates the hogs.

The struggling of some hogs at the dispatching station is undesirable. The attendant may have difficulty in finding the target and must take great precaution against harming any marketable portion of the hogs. Another disadvantage present due to the struggling of the hog is the spattering of blood released from the hog. This results in a certain amount of loss during the subsequent collection of the blood.

Attempts have been made to overcome the undesirable conditions accompanying the slaughtering of hogs. Some of the attempts have included the stunning of hogs or immobilization of them in such a manner as to allow easier handling and dispatching of the hogs during the operation. Success has been realized from the immobilization of hogs by subjecting them to an atmosphere of carbon dioxide gas. The hogs are retained under the influence of the gas for a sufficient length of time to stun or immobilize them, and yet not cause their death. The hogs in an immobile state are then conveyed to the dispatching station and are dispatched in the usual manner without the accompanying disadvantages of handling conscious and active hogs. The apparatus utilized up to the present time has consisted primarily of some form of conveying means entailing a high expenditure and requiring considerable space.

It is therefore an object of the present invention to provide suitable apparatus for the immobilization and handling of animals prior to the slaughtering thereof.

It is a further object to provide a simple, economical and practical apparatus which is readily adaptable to existing facilities for the slaughtering of hogs.

Still another object is to provide an immobilization chamber having incorporated therein an elevator specially constructed to handle animals during the immobilization thereof.

Still a further object is to provide immobilization handling apparatus suitable for automatic operation whereby a considerable reduction in the number of operators is realized.

Other objects not specifically set forth will become apparent from the following detailed description.

The present invention generally comprises a novel arrangement of apparatus including novel structures which have been found to provide efficient handling of immobilized animals while having space and cost saving features incorporated therein. The present invention generally provides means for conveying active animals from a waiting pen to a chamber wherein the animals are immobilized by the use of a gas such as carbon dioxide and thereafter removed by conveying means to the shackling point wherefrom they are conveyed by suitable means to the dispatching station.

In the accompanying drawings, similar reference characters in the several figures designate similar parts.

In the drawings:

Figure 3 is an isometric view of the frame of the elevator.

Figure 4 is a cross sectional view of the gas chamber and elevator taken along the line 4—4 shown in Figures 2 and 5.

Figure 5 is a plan view of the gas chamber with the elevator removed.

Figure 6 is a diagrammatic showing of the operative positions of the elevator.

Figure 1:
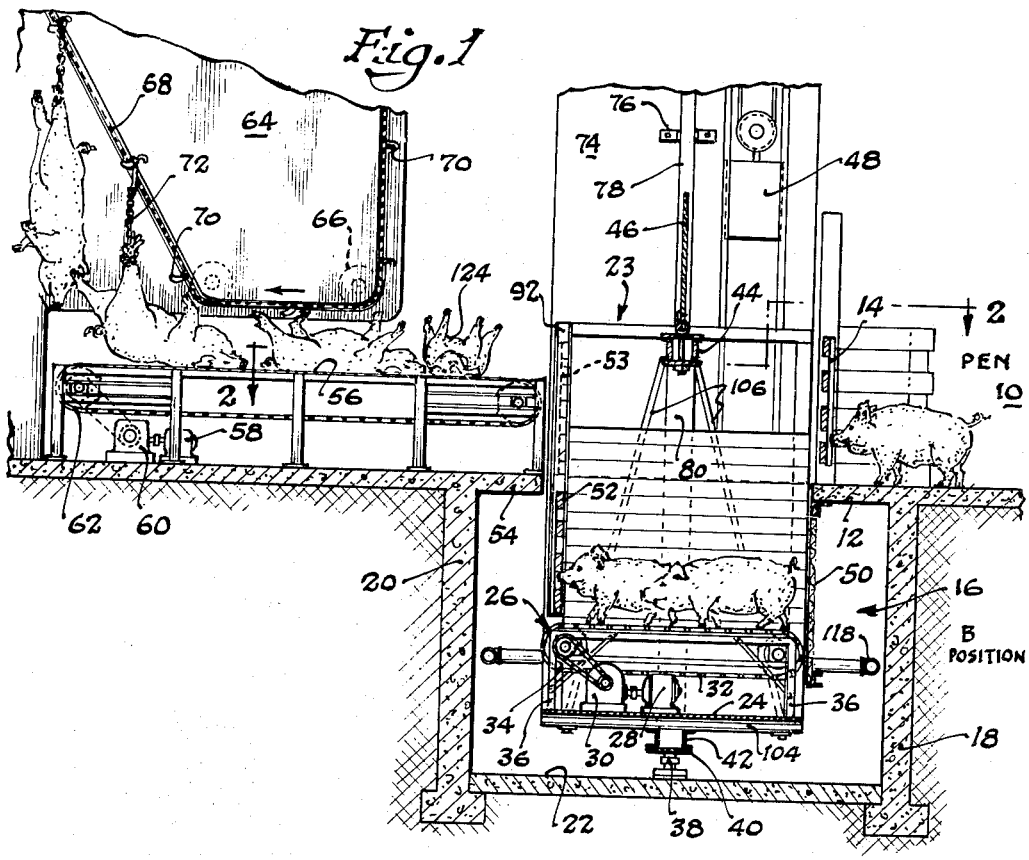
Figure 1 is a combination cross sectional and elevation of the apparatus of the present invention. The cross sectional portion of Figure 1 is taken along the line 1—1 as shown in Figure 2.

In Figure 1, reading from right to left, 10 designates the hog storage pen terminated at the end of the overhanging portion 12 of the pen floor by gate 14. The overhanging portion of the pen floor 12 forms a part of gas chamber 16 which is defined by walls 18 and 20 and floor 22, and which is shown buried. The walls 18 and 20 as shown in Figure 1 are the front and back walls respectively. Elevator 23 serves as an animal confining means and, as shown in Figure 1, is positioned within gas chamber 16. The elevator includes a platform 24 on which is positioned conveyor 26. The conveyor is driven by motor 28 through the gear reducer 30 and comprises conveyor belt 32 which is driven by the sprocket 34, which in turn is mounted on the conveyor frame 36. Positioned directly below the elevator on the gas chamber floor 22 is car buffer 38. The car buffer contacts buffer plate 40 which is attached to the underside of elevator platform 24 by means of channel beams 42. Elevator 23 is suspended through the sling 44 by means of cable 46 and counterweight 48. The complete system of suspension is not shown as such is conventional. A fixed screen 50 is mounted on the underside of the overhanging pen floor 12 and extends down into gas chamber 16 sufficiently to cover the opening between conveyor 26 and pen floor 12 when conveyor 26 is in its lowermost position. A movable gate 52 is mounted on the elevator 23 directly opposite the fixed screen 50 and cooperates with conveyor 26 and the overhanging portion of the hoist floor 54 to close the opening therebetween when the elevator is within the chamber. The dotted lines at 53 show gate 52 in the raised position which will later be explained. Mounted on the hoist floor 54 is the hoist conveyor 56. This conveyor is driven by motor 58 through gear reducer 60 and sprocket 62. The conveyor 56 extends beneath the overhanging portion of the hoist 64. The hoist is of conventional design and includes driving means 66 connected to the hoist chain 68 to which are attached hooks 70 which, in turn, cooperate with the leg chains 72 in raising the unconscious hogs from the hoist conveyor 56.

Figure 2:
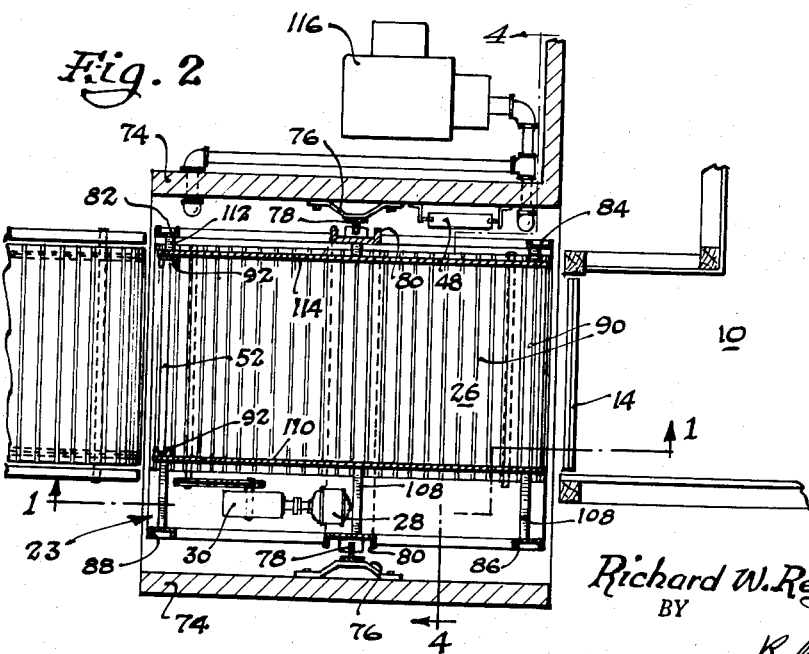
Figure 2 is a plan view of a portion of the apparatus taken along the line 2—2 as shown in Figure 1.

In Figure 2 an enlarged plan view of the gas chamber 16 and conveyor 26 is shown. The side walls 74 of gas chamber 16 have attached thereto wall braces 76. These braces support guide bars 78 in a vertical position within and above gas chamber 16 as shown in Figure 4. Attached to the elevator 23 and forming a portion of the frame thereof are shoes 80. These shoes are channel beams which also serve as a portion of the frame of the elevator 23, as will more clearly be described. The shoes form channels which cooperate with the guides 78 in controlling the direction of vertical movement of elevator 23. Channel beams 82, 84, 86, and 88 also form a portion of the frame of elevator 23 and will be described more clearly in connection with Figure 3. In Figure 2, numeral 90 designates the cross bars which form the conveyor belts of conveyors 26 and 56. The gate guides 92 form channels in which gate 52 moves vertically.

Figure 3 is inserted to more clearly show the general framework of elevator 23. While such framework is conventional, it is shown for purposes of clarifying and identifying the different parts shown in the other figures. As can be seen in Figure 3, sling 44 serves also as a cross member of the upper framework of elevator 23. The frame members 96, 98, 42, and 102 cooperate with the previously described support members 80, 82, 84, 86, and 88 to make up the entire frame structure. As previously described, channel beams 42 support buffer plate 40 (Figure 1) which cooperates with the car buffer 38 mounted on the floor 22 of gas chamber 16. I beams 104 support elevator platform 24. These members run perpendicular to frame members 98 and 102 and are mounted between these members and above member 42. The diagonal guy wires 106 add further stability to the elevator frame.

In Figure 4 several long braces 108 are shown attached at one end to one of the shoes 80 and at the other end to side board 110. This side board is positioned immediately above conveyor 26 and cooperates with side board 114 which is directly opposite it, gate 52, and fixed screen 50, shown in Figure 1, to form a closed chamber directly over conveyor 26. Side board 114 is mounted to the other shoe 80 by means of short braces 112. A gas pump 116 is positioned outside of gas chamber 16 and introduces gas into gas chamber 16 through gas line 118 which contains perforations 120.

In Figure 5 a plan view of gas chamber 16 is shown with the elevator 23 removed. The dotted lines show the space that elevator 23 occupies in the chamber and also shows shoes 80 positioned along the sides of elevator 23 in cooperation with guides 78 which are attached by brackets 76 to the gas chamber walls 74. Gas lines 118 are also shown in their relative position with the arrows indicating the direction of discharge of gas therefrom. Car buffer 38 is shown in its central position on the gas chamber floor. To one side of car buffer 38 is positioned a drain 122 which contains suitable plugging means. This drain is positioned at a point where the sloped sections of the gas chamber floor meet.

Figure 6 will be described in detail during the following full explanation of the operation of the apparatus:

With particular reference to Figure 6, it can be seen that the elevator 23 has three separate operative positions. Position A is that in which the conveyor 26 mounted on elevator 23 is level with the pen floor 12 and the hoist floor 54. This position allows the hogs to be driven onto the conveyor 26 through gate 14 from the pen 10. While this is being done it is readily apparent that the conveyor 26 remains motionless. The hogs are then enclosed within the confines of the elevator by the lowering of gate 14. This gate combines with gate 52 and side boards 110 and 114 in defining an enclosed area within the elevator.

The elevator is then lowered into gas chamber 16, and during this operation gate 52 remains in place along with side boards 110 and 114, whereas gate 14 remains on the upper side of the pen floor 12. However, no opening occurs while the elevator is being lowered as the fixed screen 50 comes into operative position. The elevator is lowered by conventional means which includes the use of counterweight 48, cable 46, and sling 44 until buffer plate 40 comes into contact with car buffer 38 mounted on floor 22 of the gas chamber 16. In referring to Figure 6 it can be seen that the elevator is then in position B.

At this point of the operation the hogs are confined within the gas chamber and are detained there for a sufficient period of time to become immobilized by the action of a suitable gas, such as carbon dioxide, which is introduced into gas chamber by means of the gas pump 116 and the gas lines 118. As carbon dioxide is heavier than air, the gas chamber remains filled with the carbon dioxide and very little, if any, escapes through the opening through which the elevator is lowered.

After a period of time has elapsed sufficient to immobilize the hogs, the elevator is then raised to position C as shown in Figure 6. As the hogs are immobile at this point, it is not necessary to have a complete enclosure surrounding the conveyor or the elevator. Therefore, as the elevator rises to position C while gate 52 remains in its former position along with side boards 110 and 114, fixed screen 50 and gate 14 are no longer in an operative position. In other words there is an opening at the front portion of the elevator.

In removing the immobile hogs from the elevator when the elevator has reached position C, gate 52 is raised into a position relative to conveyor 26 as shown by the dotted lines in Figure 1, and conveyor 26 is put into operation. At the same time, conveyor 56 is also operated and the hogs are transferred mechanically from conveyor 26 to conveyor 56 without any manual operation necessary. This transfer is readily accomplished due to the proximity of the two conveyors as can be seen diagrammatically in Figure 6. Following this transfer the elevator is again lowered to position A where a new supply of hogs is loaded and the operation cycle continues.

As can be seen in Figure 1, the hogs, when driven onto conveyor 26 and elevator 23, may be facing toward or away from the hoist 64. Due to the operation of the hoist, which is of a conventional nature, it is immaterial in which direction the hogs face as hind legs are accessible at all times to the operator for chaining to the hoist. The chaining is accomplished, as shown in Figure 1, at the point where the hogs have been transferred from conveyor 26 to conveyor 56. Upon the introduction of the immobile hogs onto conveyor 56, it is necessary only for an operator to grasp a hind leg of each hog and attach it to the hoist in the conventional manner. Due to the arrangement of the apparatus no special problem is created by the immobility of the hogs at this point of the operation. As indicated by hog 124 in Figure 1, the hogs may be readily attached to the hoist 64 regardless of their position. This is true solely because of the special combination of apparatus of the present invention. The operation of conveyor 56 may be synchronized with the operation of the hoist 64 in such a manner as to provide for the movement of the hogs along a path parallel with the direction of movement of the hoist chain 68 and hooks 70. When the speeds of travel of the hoist and conveyor are synchronized the hogs are moved forward by the conveyor while being lifted from the conveyor by the hoist. Due to this arrangement the hogs may be attached to the hoist regardless of their position upon being introduced onto the conveyor. No scrapping or damage occurs due to the dragging of the hogs across a surface when the hogs are lifted by the hoist. The special advantage is highly desirable.

It should also be clear that the hoist conveyor 56 can be eliminated and the immobile hogs directly removed from the conveyor 26 by the hoist 64. While it is preferred to make use of hoist conveyor 56 for the reasons set forth above, it is nevertheless possible to locate the hoist 64 in sufficient proximity to conveyor 26 so as to lift the immobile hogs directly from the conveyor when the elevator is in position C.

As can be seen in Figures 2, 4, and 5, the wall braces 76 upon which guides 78 are mounted cooperate with the shoes 80, the latter also acting as a portion of the elevator frame, to control the vertical movements of the elevator 23. Due to this particular arrangement, the elevator travels in a fixed vertical direction and the travel is uniform in each case.

In Figure 5 drain 122 is included in the structure of the gas chamber 16 for the purpose of allowing the removal of any collected material which may become deposited upon the floor of the gas chamber. This drain should be plugged in such a manner so as to eliminate the escaping of gas during the immobilizing operation. When it is necessary to make repairs within the gas chamber, or when it is desirable to clear the chamber, the gas, normally carbon dioxide, may be removed from the chamber by any suitable purging operation such as the use of steam or air.

As stated above, the hoist 64 is not shown in any great detail as it is conventional equipment normally found in use in such an operation. The operating mechanism of the elevator 23 has not been shown in any great detail inasmuch as this type of mechanism is conventional. The mechanism has been cut away in Figure 1 as a matter of convenience as it is not considered necessary to further describe such conventional equipment. The counterweight 48 operates in the expected manner in conjunction with the elevator to aid in the operation of the elevator. Gates 14 and 52, as shown, are operated manually, but it is fully recognized that automatic operation may be utilized if such is considered desirable. With respect to automatic operation, it can be incorporated in the entire system and, as a result, the number of operators necessary would be even further greatly reduced. An electrical or mechanical system could be installed whereby the elevator could be raised or lowered in predetermined cycles, gates opened and closed at spaced intervals throughout the cycles, and the conveyors turned on and off in proper sequence throughout the cycles.

The chamber 16 is shown buried in Figures 1 and 4 for spaces-saving reasons as well as convenience. The space-saving reasons are obvious whereas the main source of convenience resides in the fact that the apparatus of the present invention may be incorporated more readily in existing locations by the burying of the chamber rather than the elevating of existing equipment. For example, as the hoist is conventional, by burying the chamber it would be unnecessary to elevate the hoist, which in turn would require a substantial change in equipment associated with the hoist. Another desirable feature present in the use of a buried chamber resides in the reduced loss of immobilizing gas. A buried chamber can more readily be maintained leak-proof and, as a result, the operating costs are substantially reduced.

It should be pointed out that it is not the purpose of the present invention to utilize this apparatus to kill the hogs with carbon dioxide, but rather to subject them to the action of carbon dioxide only sufficiently to immobilize them throughout the subsequent killing operation. In other words, the purpose is to overcome their voluntary actions while not affecting their involuntary processes.

Obviously, many modifications and variations of the invention as hereinbefore set forth may be made without departing from the spirit and scope thereof, and therefore only such limitations should be imposed as are indicated in the appended claims.

I claim:

1. Apparatus suitable for use in animal slaughtering which comprises: means providing a chamber, animal confining means positioned for vertical movement within said chamber; means for delivering said animal confining means into and out of said chamber, conveying means mounted within said animal confining means, and gas delivering means associated with said chamber.

2. Apparatus suitable for use in the immobilization of animals prior to the slaughtering thereof which comprises: means providing a chamber, animal confining means positioned for vertical movement within said chamber, means for delivering said animal confining means into and out of said chamber, conveying means mounted on said animal confining means, gate means for said animal confining means to control the ingress and egress of said animals, and gas delivering means associated with said chamber.

3. Apparatus suitable for use in the immobilization of animals prior to the slaughtering thereof which comprises: means providing a chamber, overhanging rims forming a partial closure for the top of said chamber, animal confining means, means for delivering said animal confining means into and out of said chamber between said overhanging rims, conveying means mounted within said animal confining means, gate means for said animal confining means to control the ingress and egress of said animals, additional conveying means associated with said chamber and mounted over one of said overhanging rims to cooperate with said first-mentioned conveying means when said first-mentioned conveying means is delivered from said chamber, and gas delivering means associated with said chamber.

4. An animal immobilizing device which comprises: means providing a chamber, animal confining means having a vertical path of travel, guides associated with said chamber for controlling the travel of said animal confining means in said chamber, conveying means mounted within said animal confining means, gate means for said animal supporting means to control the ingress and egress of said animals, and gas delivering means associated with said chamber.

5. An animal immobilizing device which comprises: means providing a chamber, animal confining means having a path of travel, guides associated with said chamber for controlling the travel of said animal confining means in said chamber, overhanging rims forming a part of said chamber and partially closing said chamber at the top thereof, conveying means mounted within said animal confining means, gate means for said animal confining means to control the ingress and egress of said animals, and gas delivering means associated with said chamber.

6. An animal immobilizing device which comprises: means providing a chamber, a platform, a movable animal confining means supporting said platform, guides associated with said chamber for controlling the travel of said animal confining means and said platform into and out of said chamber, overhanging rims forming a part of said chamber and partially closing said chamber at the top thereof, conveying means mounted on said platform, drive means associated with said conveying means and mounted on said platform, gate means for said animal confining means to control the ingress and egress of said animals, and gas delivering means associated with said chamber.

7. An elevator suitable for use in combination with a gas chamber wherein animals are immobilized prior to the slaughtering thereof, which comprises: animal confining means, a platform carried by said animal confining means, upright members forming a part of said animal confining means and having continuous recesses extending along the respective lengths of said members, fixed guides cooperating with said recesses for controlling the direction of vertical movement of said elevator, conveying means mounted on said platform within said animal confining means, driving means mounted on said platform and operatively associated with said conveying means, and gate means for said animal confining means to control the ingress and egress of said animals.

8. An animal immobilizing apparatus comprising: means providing a chamber, inwardly extending rims forming a partial closure at the top of said chamber, gas delivering means positioned in said chamber, animal confining means mounted for vertical movement into and out of said chamber between said rims, a platform carried by said animal confining means, conveying means carried by said platform within said animal confining means, drive means mounted on said platform and operatively associated with said conveying means, vertical members forming a part of said animal confining means, recesses extending along the length of said members, guides associated with said chamber and cooperating with said recesses to direct the vertical movement of said animal confining means, gate means for said animal confining means to control the ingress and egress of said animals, a buffer mounted in said chamber, buffer receiving means mounted on said animal confining means to cooperate with said buffer and thereby limit the movement of said animal confining means into said chamber.

9. An animal immobilizing device comprising: means providing an enclosed chamber having an opening in the top thereof and adapted to hold an animal immobilizing gas heavier than air, animal confining means, conveying means within the animal confining means and forming the floor of said animal confining means, gate means for said animal confining means to control the ingress and egress of the animals, and means to lower and raise said animal confining means into and out of said chamber through said opening.

10. An animal immobilizing device comprising: means providing an enclosed chamber having an opening in the top thereof and adapted to hold an animal immobilizing gas heavier than air, animal confining means, conveying means within the animal confining means and forming the floor of said animal confining means, gate means for said animal confining means to control the ingress and egress of the animals, means to lower and raise said animal confining means into and out of said chamber through said opening, and gas delivering means associated with said chamber.

References Cited in the file of this patent

UNITED STATES PATENTS

| | | |
|---|---|---|
| 860,622 | Bannerman et al. | July 23, 1907 |
| 1,977,098 | Neher | Oct. 16, 1934 |
| 2,185,949 | Regensburger | Jan. 2, 1940 |
| 2,526,037 | Murphy | Oct. 17, 1950 |